July 31, 1962 J. A. JOHNSON ETAL 3,047,163
CUSHIONING ASSEMBLY
Filed Aug. 7, 1957 2 Sheets-Sheet 1

INVENTORS
John A. Johnson
George R. Kennedy
BY
Robert A. Shields
ATTORNEY

July 31, 1962　　J. A. JOHNSON ETAL　　3,047,163
CUSHIONING ASSEMBLY

Filed Aug. 7, 1957　　2 Sheets-Sheet 2

INVENTORS
John A. Johnson
George R. Kennedy

BY *Robert A. Shields*

ATTORNEY

United States Patent Office 3,047,163
Patented July 31, 1962

3,047,163
CUSHIONING ASSEMBLY
John A. Johnson, Short Hills, N.J., and George R. Kennedy, Nescopeck, Pa., assignors to ACF Industries, Incorporated, New York, N.Y., a corporation of New Jersey
Filed Aug. 7, 1957, Ser. No. 676,734
15 Claims. (Cl. 213—40)

This invention relates to cushioning assemblies, and, more particularly, to rubber shock absorbing mechanism of the type used in railway car draft gears, for example.

Heretofore, various cushioning assemblies of the foregoing type have been proposed, and, while many of them have met with a certain amount of commercial success, they have embodied several inherent difficulties. For example, in order to maintain a proper alignment of the individual rubber and separator elements in stable columnar form, the rubber and separator elements were often flat sections bonded together to provide an integral unit, making necessary the provision of expensive dies for use in the bonding operation. Then too, in all such cushioning assemblies, very extreme structural demands are made on the separator and housing elements and many failures are due to deformed, or, in some cases, torn separator elements or housings.

Accordingly, it is an object of the present invention to provide a cushioning assembly which overcomes the foregoing difficulties and disadvantages.

Another object is to provide such an assembly which affords columnar stability of the stacked elements both under bending and shear.

Another object is to provide such an assembly in which the separator elements are so constructed as to provide some resilience which adds to the ability of the assembly to take loads and which enables the separator elements to better resist distortion and tearing.

A further object is to provide such an assembly in which the rubber and separator elements are stacked in alternate but structurally independent relation and yet the friction between parts is reduced to a minimum.

A still further object is to provide such an assembly which is simple, durable and economical in construction, is readily assembled, is reliable in operation, requires little or no maintenance, and is sufficiently rugged to withstand the demands of normal usage.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a cushioning assembly comprising, in combination, a pair of followers, and a stack of resilient means and separator means in alternate superimposed relation between the followers, each of the resilient means having angularly related inclined upper and lower surfaces and each separator means being formed with upper and lower surfaces for mating engagement with its adjacent resilient means. To reduce friction and possible damage between the parts, a film of lubricant is applied between the resilient means and the separator means and on the faces of the followers which contact the resilient means. The lubricating feature may be built into either the resilient means or the separator plates.

A preferred embodiment of the invention has been chosen for purposes of illustration and description, and is shown in the accompanying drawing, forming a part of the specification, wherein.

Figure 3:
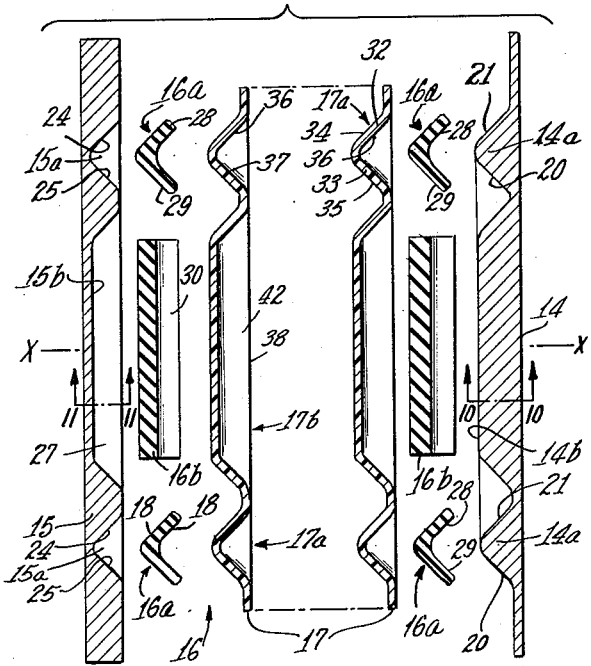
FIG. 3 is an exploded, fragmentary cross-sectional view of a cushioning assembly in accordance with the present invention taken on line 3—3 of FIG. 2.
Figure 4:
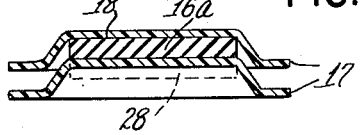
FIG. 4 is a cross-sectional view taken along the lines 4—4 of FIG. 2.
Figure 5:
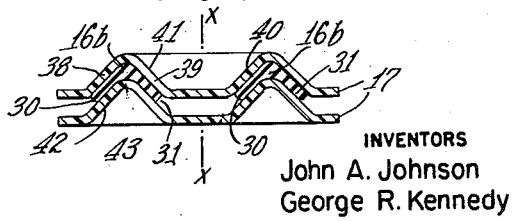
FIG. 5 is a cross-sectional view taken along the lines 5—5 of FIG. 2.
Figure 9:
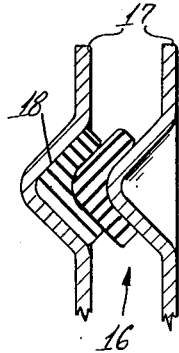
Figure 10:
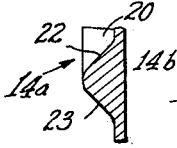
Figure 11:
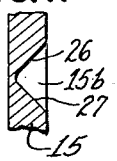

FIG. 9 is a fragmentary cross-sectional view of a cushioning assembly illustrating a modification of the invention; and FIGS. 10 and 11 are detail sectional views on lines 10—10 and 11—11 of FIG. 3.

Figure 1:
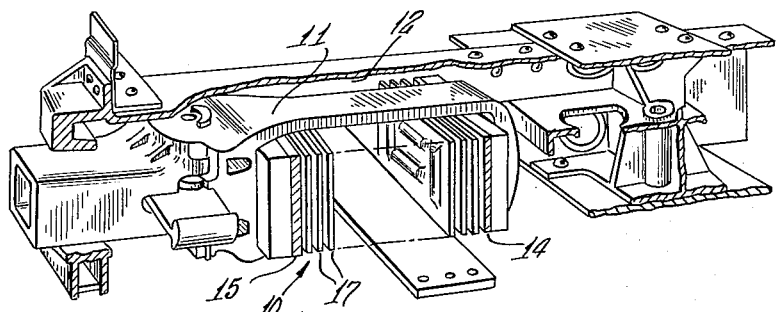
FIG. 1 is a fragmentary perspective view, partly in cross section, of a railroad car draft rigging incorporating a cushioning assembly of the present invention.
Figure 2:
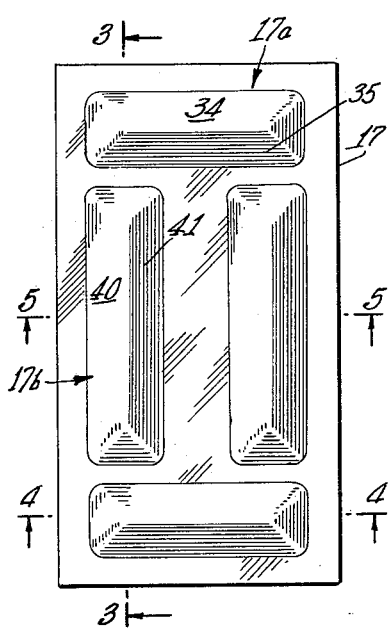
FIG. 2 is a plan view of one of the separator means.

Referring to the drawing in detail, FIG. 1 shows an application of the present invention in which the cushioning assembly 10 and a yoke 11 of the vertical swivel type are mounted in the draft gear pocket 12 of a railway car similar to that illustrated in FIG. 10.68 on page 952 of the 1946 Car Builder's Cyclopedia.

Figure 6:
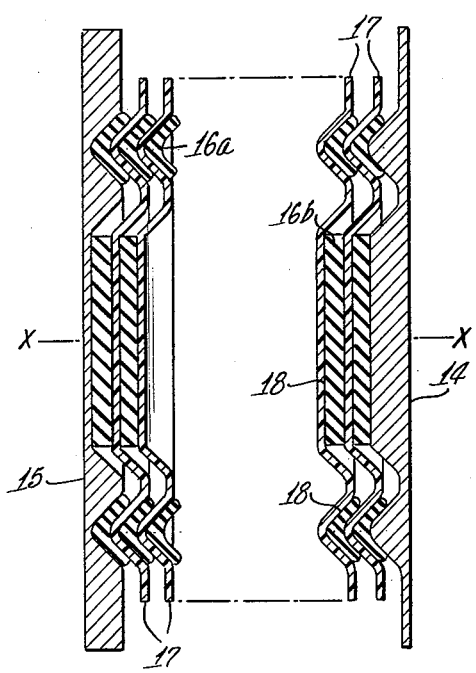
FIG. 6 is a view similar to FIG. 3 but showing several of the parts in unexploded relation.

As shown in FIGS. 1, 3 and 6, the cushioning unit includes a pair of followers 14 and 15 between which are stacked a multiplicity of alternately superimposed resilient means 16 and separator means 17. The followers and separators extend in a substantially vertical plane and perpendicularly to the longitudinal axis $x$—$x$ of assembly 10, the axis $x$—$x$ being substantially horizontal when incorporated in ordinary railway draft rigging.

The follower 14 is a rectangular plate formed with a plurality of elongated raised sections or ridges 14a and 14b each presenting an exterior contour of right angular or V-shape as viewed in FIGS. 3 and 6. The ridges 14a have the side surfaces 20, 21 equally and oppositely inclined to axis $x$—$x$ and ridges 14b have side surfaces 22, 23 equally and oppositely inclined to axis $x$—$x$. The longitudinal axes of surfaces 20, 21 extend substantially perpendicularly to the longitudinal axes of the surfaces 22, 23. It is preferred that the elongated sections 14a be disposed at an angle to the sections 14b, and, as illustrated, two such sections 14a extend parallel to the transverse axis of the follower 14 and are separated by a pair of parallel sections 14b perpendicular thereto or parallel to the longitudinal axis of the follower.

The follower 15 consists of a plate having a plurality of elongated depressions or recesses 15a and 15b having a contour of right angular or V-shape as viewed in FIGS. 3 and 6, and, these depressions are of such a size and disposition as to mate with the raised sections 14a and 14b of the follower 14 if the followers were fitted together. The recesses 15a are defined by side walls or surfaces 24, 25 equally and oppositely inclined to the axis $x$—$x$ of assembly 10 and recesses 15b are defined by side walls or surfaces 26, 27 equally and oppositely inclined to axis $x$—$x$. The longitudinal axes of surfaces 24, 25 extend substantially perpendicularly to the longitudinal axes of surfaces 26, 27.

In the embodiment of the invention chosen for illustration in FIGS. 1 to 8, each of the resilient means 16 consists of four elongated right angle or V-shaped in cross-section pads or pieces 16a, 16b of rubber, synthetic rubber, or other rubber like material which may be extruded conveniently and economically and then cut to the length desired, the resulting bodies thus having the described cross sectional shape throughout their entirety. Bodies 16a have the arms 28, 29 extending at right angles one to the other and the bodies 16b have the arms 30, 31 extending at right angles one to the other.

As shown in FIGS. 2 to 6, the separator means 17 each consist of an imperforate plate thinner than either of the followers 14 and 15 or the resilient means 16, and rectangular in plan with longitudinal and transverse dimensions slightly less than the corresponding follower dimensions. These separator plates are each formed with portions extending from and connecting the spaced sides of two pairs of corrugations 17a and 17b. The corrugations 17b each extend adjacent and parallel to a longitudinal margin of the plate and have their ends spaced equidistantly from the transverse axis thereof. The corrugations 17a bracket the corrugations 17b and each extends adjacent and parallel to a transverse margin of the plate, has its ends spaced equidistantly from the longitudinal axis thereof, and is of sufficient length to overlie the ends of the corrugations 17b. It will be noted that the corrugations 17a and 17b all project in the same direction with respect to the plane surfaces of the plate and would interfit with the corresponding portion a and b of the follower plates if the plates and followers were in direct contact. Corrugations 17a have the side walls 32, 33 equally and oppositely inclined to the longitudinal axis $x-x$ of assembly 10 and having outer surfaces 34, 35 and inner surfaces 36, 37 respectively. Corrugations 17b have the side walls 38, 39 equally and oppositely inclined to axis $x-x$ and having outer surfaces 40, 41 and inner surfaces 42, 43 respectively.

The ridges 14a, 14b, the recesses 15a, 15b, the resilient angle pieces 16a, 16b and the corrugations 17a, 17b are thus all of complementary formation and the respective inclined surfaces thereof are in parallel contact each with the adjacent inclined surface when the parts of the device are intercalated. In such condition the angle pieces 16a, 16b are nested with the recesses, corrugations and ridges, and the entirety of the bodies 16a, 16b is in contact with the said inclined surfaces in the inactive condition of the assembly.

It should also be noted that the corrugations stiffen the plate yet at the same time lend a certain resilience to the plate for as the corrugations tend to flatten the marginal edges of the plate act in hoop tension and will pull the corrugations back to shape.

To prepare the assembly for use, the angle pieces 16a and 16b are coated with a suitable lubricant 18, such as a molybdenum disulfide grease, and are superimposed on their respective corresponding raised sections 14a or 14b of the follower 14. A separator 17 is then coated with a film of grease and superimposed in mating relation, that is, with the apices of its corrugations 17a and 17b in alignment with the respective corresponding apices of the angle pieces 16a and 16b, on the resilient means to sandwich the same between it and the follower 14. Resilient means and separator means are then lubricated and alternately superimposed one upon the other to form a stack of desired length. The follower 15 is then superimposed upon the last resilient means, so that there is always one more resilient means 16 than separator means 17 in the stack. It will be noted that the nested inclined surfaces of the followers, separators, and resilient means together with their angular relationship tend to hold the column centered and stable.

For instance, it is known that under a buffing force a column of flat plates and flat rubber mats seeks any possible sidewise escape from the compressive force. Bearing in mind that the longitudinal axis of a draft gear or cushioning assembly extends horizontally, and that the followers and separators therefore extend in a vertical plane, there is a tendency of the column constituted by the assembly to sag at its middle or to rest on its bottom, due to gravity, thereby presenting the lateral force which will be greatly magnified under compression. However, in the present device any force inclined to the longitudinal axis is almost squarely opposed by approximately one quarter of all the resilient material, and columnar stability is maintained. Thus a force acting upwardly of FIGURE 2, or more exactly, upwardly from right to left of FIGURE 3 and seeking to distort the column would be squarely opposed by the arms 28 of pieces 16a nested in the corrugations 17a, while a downward force would be resisted by the arms 29 of said pieces. Likewise, a force acting leftwardly of FIGURE 2 would be resisted by arms 30 of pieces 16b nested in corrugations 17b and a rightward force would be resisted by the arms 31 of said pieces.

Figure 7:
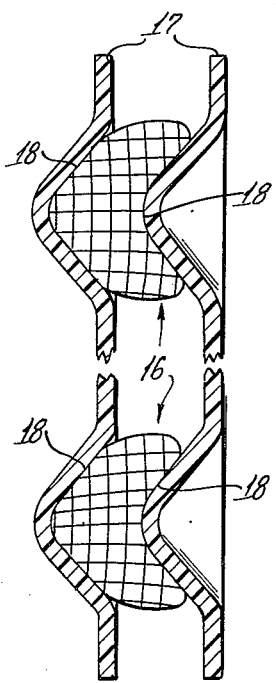
FIG. 7 is a fragmentary cross-sectional view of resilient means sandwiched between two separator means in uncompressed condition and marked with grid lines.
Figure 8:
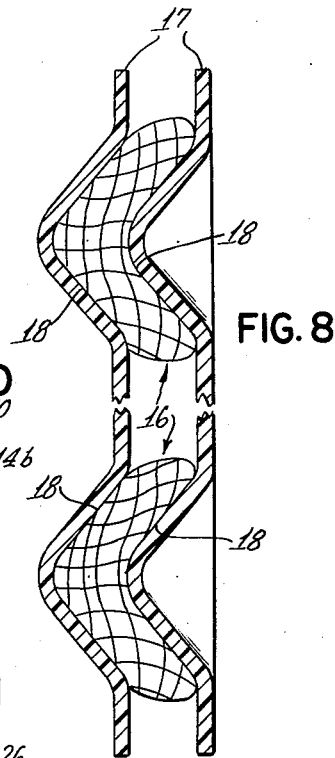
FIG. 8 is a view similar to FIG. 7 but illustrating the parts under compressive loading.

FIGS. 7 and 8 illustrate the action which takes place between the separator means when the cushioning assembly is brought from an unloaded to a loaded condition. These drawings, showing the grid lines 19 were reproduced from actual test assemblies and demonstrate that, when the assembly is loaded, the spaced sides, connecting the upper and lower diverging surfaces of the V-shaped resilient angle piece 16, extend between the spaces defined by the adjacent surfaces of the connecting portions of the separator means. The film of lubricant 18, extending continuously between the contacting surfaces enables the upper and lower diverging surfaces of the resilient means 16 to slide along the adjacent surfaces of the separator means 17 from the position shown in FIG. 7 to that shown in FIG. 8 thereby in effect increasing the bulge area and hence the resistance. Without lubricant the bulge area would not increase to as marked a degree and the movement between the separator plates would be less thereby decreasing the overall movement of the gear.

It will be noted from all of the above that the resilient means 16 located between each two separator plates 17 and also between each follower 14, 15 and the respective adjacent plate 17, consists of a plurality of discrete bodies 16a, 16b each of which is at all times out of contact with any other such body in the assembly. The material of the bodies thus has space into which it may flow and the assembly therefore never goes solid and has very high capacity.

It is also true that in the preferred construction illustrated, the resilient means 16 is in contact only with the surfaces 20—27 and 34—37 each of which has an inclination to axis $x-x$ equal and opposite to one other surface of the group and none of which extend in the plane perpendicular to axis $x-x$, and thus differing from conventional construction.

FIG. 9 shows a modification of the invention wherein the resilient means 16 each include two sets of angle pieces 16a and 16b in nested contiguous relation between separator means, or between a separator means and a follower, as the case may be. The advantage of this arrangement is that the space between separator means is increased so that for a given size assembly, less separator means are actually used. Then too, tests have shown that the resilient means shock absorbing potential is increased more by using two sets of angle pieces than it is by merely using a single set of double thickness.

The plates 17 may, of course, be fabricated of any suitable material. However, for certain special applications, very satisfactory results have been obtained by fabricating glass fiber reinforced plastic plates to the desired shape. The glass fiber reinforced plates were lighter than steel and slightly more resilient. Also the lubricant can easily be built into the fiber separators.

From the foregoing description, it will be seen that the present invention provides a cushioning assembly in which the angle or V-shaped portions of the follower, separator and resilient parts are superimposed in a nested manner to provide columnar stability in all directions and in which the corrugations in the separator means add resilience to those members so that they actually contribute to the ability of the assembly to take loads and, at the same time, resist tearing and distortion. It will also be seen that the present invention provides an economical, reliable, rugged and easily maintained cushioning assembly wherein the parts are lubricated to reduce friction therebetween and to extend the life of the resilient means. Since the parts are structurally independent, replacement is a simple and economical matter as only defective members need be replaced instead of the entire assembly, as is the case where the parts are bonded or otherwise structurally integrated. Also sizes may be readily and cheaply changed to meet changed loadings.

As various changes may be made in the form, construction and arrangement of the parts herein without departing from the spirit and scope of the invention and without sacrificing any of its advantages, it is to be understood that all matter herein is to be interpreted as illustrative and not in any limiting sense.

What is claimed is:

1. A cushioning assembly of the class described comprising, in combination, a pair of followers, and a stack of resilient means and separator means in alternate superimposed relation between said followers, said resilient means each including two elongate members, each member having a body V-shaped in cross-section throughout the entirety thereof and said two members having their longitudinal axes in perpendicular relation to each other, and each separator means being formed of one piece with contours of V-shape in cross-section formed therein for mating with its adjacent resilient means, said separator means and resilient means being free of attachment one to the other.

2. A cushioning assembly of the class described comprising, in combination, a pair of followers, a stack of resilient means and corrugated separator means in alternate superimposed relation between said followers, said resilient means each including two elongate members having bodies V-shaped in cross-section throughout their entirely and having their longitudinal axes in perpendicular relation one to the other, and each separator being formed of one piece and having corrugations formed therein with contours of V-shape in cross-section and in perpendicular relation one to another for mating with its adjacent resilient means, said resilient means and separator means being free of attachment one to the other, and a film of lubricating medium interposed extending continuously between mating surfaces of said resilient means and said separator means.

3. A cushioning assembly of the class described comprising, in combination, a pair of followers, a stack of resilient means and corrugated separator means in alternate superimposed relation between said followers, said resilient means including a pair of adjacent parallel elongate members having bodies V-shaped in cross-section throughout their entirety, and a pair of similar members having their longitudinal axes perpendicular to said first mentioned pair of members and disposed in straddling relation thereto, each said member being formed with spaced edges connecting upper and lower diverging surfaces, each separator being formed with corrugations having contours of V-shape in cross-section for mating with its adjacent resilient means and with flat portions connecting said contours, said flat portions of said separator means defining spaces into which said spaced edges of said elongated members may extend when said assembly is loaded, and a film of lubricating medium extending continuously between mating surfaces of said resilient means and said separator means to facilitate the extending of said edges into said spaces.

4. A cushioning assembly of the class described comprising, in combination, a pair of followers, and a stack of resilient means and separator means in alternate superimposed relation between said followers, said resilient means including an angle member V-shaped in cross-section throughout its entirety, said member being formed with spaced edges connecting upper and lower diverging surfaces, a second such member in nested contiguous relation to said first mentioned member, and each separator means being formed of one piece with corresponding V-shaped corrugations for mating with its adjacent resilient means and with flat portions connecting said V-shaped corrugations, said flat portions of said separator means defining spaces into which said spaced edges of said resilient angle members may extend when said assembly is loaded.

5. A cushioning assembly according to claim 4, wherein said resilient means and separator means being unattached each to the other whereby a film of lubricating medium extends continuously between mating surfaces of said resilient means and said separator means.

6. A cushioning assembly of the class described comprising, in combination, a pair of followers, a plurality of one piece separator plates, a plurality of substantially duplicate corrugations of angular cross-section formed on each separator plate and follower plate, and a plurality of resilient means interposed between the separator plates and between the separator plates and followers and free of attachment thereto, each of said plurality of resilient means being of angular cross-section throughout its entirety and nested with a corrugtion and flowing into the space between corrugations when loaded.

7. The structure of claim 6 characterized in that the longitudinal axis of at least one of said corrugations of each of said plates is substantially perpendicularly disposed with respect to the longitudinal axis of at least one other of said corrugations.

8. A cushioning assembly for a draft gear of a railway car or the like, said assembly having a longitudinal axis, said assembly having two followers and a plurality of one piece separator plates stacked between said followers, said followers and said plates extending in a plane substantially perpendicular to said axis, said plates each being formed from one piece of material with a plurality of substantially V-shaped corrugations formed therein and with flat portions therebetween, the longitudinal axis of at least one of said corrugations extending substantially perpendicularly to the longitudinal axis of at least one other of said corrugations, said followers being formed with recesses and ridges complementary to said corrugations, a resilient means located between each two separator plates and a further resilient means located between each of said followers and the respective adjacent plate, said resilient means being constituted of rubber like material and being of V cross-section throughout their entirety and being nested with said recesses and capping said corrugations and said ridges, said resilient means being free of attachment to the separator plates or followers, and a film of lubricant extending continuously between said resilient means and the surfaces of said followers and plates contacting said resilient means, each resilient means comprising a plurality of discrete bodies, each of said bodies being out of contact with any other such body of said assembly.

9. A cushioning assembly for a draft gear of a railway car or the like, said assembly having a longitudinal axis, said assembly having two followers and a plurality of separator plates stacked between said followers, said followers and said plates extending in a plane substantially perpendicular to said axis, said plates each being formed with corrugations and flat portions connecting two corrugations, said corrugations having angularly related inclined upper surfaces, and angularly related inclined lower surfaces, said surfaces being equally and oppositely inclined to said axis, said flat portions connecting another two corrugations having similarly related inclined upper and lower surfaces, said surfaces of said other two surfaces being equally and oppositely inclined to said axis and extending substantially perpendicularly to said two first mentioned surfaces, said followers being formed with surfaces complementary to said inclined surfaces of said plates, a resilient pad means located between each two plates and a further resilient pad means located between each of said followers and the respective adjacent plate, said resilient pad means being of rubber-like material and comprising a body V-shaped in cross-section throughout its entirety and having edges connecting upper and lower diverging surfaces, and said surfaces of said resilient pad means being nested with said inclined surfaces, said resilient pad means and followers and separator plates being unattached one to the other, and a film of lubricant extending continuously between said resilient means and the surfaces of said plates and followers in contact with said resilient means, said flat portions defining spaces into which said resilient pad edges may extend when said assembly is loaded.

10. A cushioning assembly for a draft gear of a railway car or the like, said assembly having a longitudinal axis, said assembly having two followers and a plurality of separator plates stacked between said followers, said followers and said plates extending in a plane substantially perpendicular to said axis, said plates each being formed with corrugations and flat portions connecting two corrugations, said corrugations having angularly related inclined upper surfaces, and angularly related inclined lower surfaces, said surfaces being equally and oppositely inclined to said axis, said flat portions connecting another two corrugations having similarly related inclined upper and lower surfaces, said surfaces of said other two surfaces being equally and oppositely inclined to said axis and extending substantially perpendicularly to said two first mentioned surfaces, said followers being formed with surfaces complementary to said inclined surfaces of said plates, a resilient pad means located between each two plates and a further resilient pad means located between each of said followers and the respective adjacent plate, said resilient pad means being of rubber-like material and comprising a body V-shaped in cross-section throughout its entirety and having edges connecting upper and lower diverging surfaces, and said surfaces of said resilient pad means being nested with said inclined surfaces, said resilient pad means and followers and separator plates being unattached one to the other, and a film of lubricant extending continuously between said resilient means and the surfaces of said plates and followers in contact with said resilient means, the entirety of said surfaces of said resilient pad means being in contact with said inclined surfaces of said plates and followers in the inactive condition of said assembly, said flat portions defining spaces into which said resilient pad edges may extend when said assembly is loaded.

11. A cushioning assembly for a draft gear of a railway car or the like, said assembly having a longitudinal axis, said assembly having two followers and a plurality of separator plates stacked between said followers, said followers and said plates extending in a plane substantially perpendicular to said axis, said plates each being formed with corrugations and flat portions connecting two corrugations, said corrugations having angularly related inclined upper surfaces, and angularly related inclined lower surfaces, said surfaces being equally and oppositely inclined to said axis, said flat portions connecting another two corrugations having similarly related inclined upper and lower surfaces, said surfaces of said other two surfaces being equally and oppositely inclined to said axis and extending substantially perpendicularly to said two first mentioned surfaces, said followers being formed with surfaces complementary to said inclined surfaces of said plates, a resilient pad means located between each two plates and a further resilient pad means located between each of said followers and the respective adjacent plate, said resilient pad means being of rubber-like material and comprising a body V-shaped in cross-section throughout its entirety and having edges connecting upper and lower diverging surfaces, and said surfaces of said resilient pad means being nested with said inclined surfaces, said resilient pad means and followers and separator plates being unattached one to the other, and a film of lubricant extending continuously between said resilient means and the surfaces of said plates and followers in contact with said resilient means, the entirety of said surfaces of said resilient pad means being in contact with said inclined surfaces of said plates and followers in the inactive condition of said assembly, and each resilient pad means comprising a plurality of discrete bodies, each of said bodies being out of contact with any other such body of said assembly, said flat portions defining spaces into which said resilient pad edges may extend when said assembly is loaded.

12. A cushioning assembly of the class described comprising, a pair of followers, and a stack of resilient means and separator means, said resilient means each including an elongated angle member having a body V-shaped in cross-section throughout its entirety and being formed with spaced sides connecting upper diverging surfaces and lower diverging surfaces, each separator means being formed from one piece of material with a first portion V-shaped in cross-section for mating with its adjacent resilient means, and with a flat second portion extending from the spaced sides of said first portion, said flat second portion of said separator means defining spaced surfaces between which said spaced sides of said elongated angle member may extend and along which said diverging surfaces of said elongated angle member may slide.

13. The cushioning assembly of claim 12 wherein said elongated angle members are unattached to said separator means and a film of lubricating medium extends continuously between contacting surfaces of said resilient means and said separator means to facilitate the flowing of said resilient angle member within said spaces.

14. A cushioning assembly of the class described comprising in combination, a pair of followers, and a stack of resilient means and separator means in alternate superimposed relation between said followers, each said resilient means comprising a plurality of separate elongated angle pieces each having a longitudinal axis in perpendicular relation to the longitudinal axis of another of said angle pieces, each of said angle pieces comprising a body V-shaped in cross-section throughout its entirety and having angularly related inclined upper surfaces and angularly related inclined lower surfaces and spaced edges connecting said upper and lower surfaces, each said separator means formed from a single sheet of material and comprising a flat portion connecting a plurality of elongated angle piece receiving corrugations each having a longitudinal axis in perpendicular relation to the longitudinal axis of another of said angle piece receiving corrugations, each of said corrugations comprising a body V-shaped in cross-section substantially throughout its entirety and having angularly related inclined upper surfaces and angularly related inclined lower surfaces, said lower surfaces of said separator means being in nesting contact with said upper surfaces of said resilient means and said upper surfaces of said separator means being in nesting contact with said lower surfaces of said resilient means in said alternate superimposed relation, said flat portions of said separator means defining spaces into which said spaced edges of said resilient means may extend when said assembly is loaded.

15. A cushioning assembly of the class described comprising, in combination, a pair of followers, a stack of resilient means and corrugated separator means in alternate superimposed relation between said followers, said resilient means including a pair of adjacent parallel elongate members having bodies V-shaped in cross section throughout their entirety, and a pair of similar members having their longitudinal axes perpendicular to said first mentioned pair of members and disposed in straddling relation thereto, each said member being formed with spaced edges connecting upper and lower diverging surfaces, each separator being formed with corrugations having contours of V-shape in cross-section for mating with its adjacent resilient means and with flat portions connecting said contours, said flat portions of said separator means defining spaces into which said spaced edges of said elongated members may extend when said assembly is loaded.

References Cited in the file of this patent

UNITED STATES PATENTS

| | | |
|---|---|---|
| 1,853,886 | Schmidt | Apr. 12, 1932 |
| 1,914,479 | Brooks | June 20, 1933 |
| 2,486,741 | Gabriel | Nov. 1, 1949 |
| 2,553,635 | Dath | May 22, 1951 |
| 2,575,491 | Dath | Nov. 20, 1951 |
| 2,625,389 | Signorini | Jan. 13, 1953 |
| 2,667,277 | Mulcahy | Jan. 26, 1954 |
| 2,775,353 | Tillou | Dec. 25, 1956 |

FOREIGN PATENTS

| | | |
|---|---|---|
| 390,633 | Great Britain | Apr. 13, 1933 |